(12) United States Patent
Hahn et al.

(10) Patent No.: US 11,745,864 B2
(45) Date of Patent: Sep. 5, 2023

(54) ELECTROMECHANICAL ACTUATOR FOR SETTING A COLLECTIVE OFFSET FOR A HELICOPTER ON A BLADE-SPECIFIC BASIS

(71) Applicant: AIRBUS HELICOPTERS TECHNIK GMBH, Calden (DE)

(72) Inventors: Steffen Hahn, Hann. Münden (DE); Andre Hausberg, Kassel (DE); Werner Pflüger, Ahnatal (DE); Daniel Fürst, Kassel (DE)

(73) Assignee: AIRBUS HELICOPTERS TECHNIK GMBH, Calden (DE)

( * ) Notice: Subject to any disclaimer, the term of this patent is extended or adjusted under 35 U.S.C. 154(b) by 483 days.

(21) Appl. No.: 17/053,323

(22) PCT Filed: May 3, 2019

(86) PCT No.: PCT/EP2019/061326
§ 371 (c)(1),
(2) Date: Nov. 5, 2020

(87) PCT Pub. No.: WO2019/215019
PCT Pub. Date: Nov. 14, 2019

(65) Prior Publication Data
US 2021/0070435 A1  Mar. 11, 2021

(30) Foreign Application Priority Data
May 8, 2018 (DE) ............ 10 2018 207 141.1

(51) Int. Cl.
| | |
|---|---|
| B64C 27/00 | (2006.01) |
| B64C 27/68 | (2006.01) |
| B64C 27/72 | (2006.01) |
| H02P 7/06 | (2006.01) |

(52) U.S. Cl.
CPC .............. *B64C 27/68* (2013.01); *B64C 27/72* (2013.01); *H02P 7/06* (2013.01); *B64C 2027/7205* (2013.01)

(58) Field of Classification Search
CPC . B64C 27/68; B64C 27/72; B64C 2027/7205; H02P 7/06; Y02T 50/30
See application file for complete search history.

(56) References Cited

U.S. PATENT DOCUMENTS 11,008,097 B2 * 5/2021 Götte ..................... F16H 1/32
2002/0018716 A1 2/2002 Kennedy et al.
(Continued)

FOREIGN PATENT DOCUMENTS

DE  10 2009 000139 A1  7/2009
DE  10 2009 001 393 A1  9/2010
(Continued)

OTHER PUBLICATIONS

Search Report issued in German Patent Application No. DE10 2018 207 141.1 dated Apr. 4, 2019 (12 pages).
(Continued)

*Primary Examiner* — Ian Jen
(74) *Attorney, Agent, or Firm* — BROOKS KUSHMAN P.C.

(57) ABSTRACT

A system for controlling an electromechanical actuator for setting a collective offset for a helicopter on a blade-specific basis, wherein the system comprises at least one actuator, the length and position of which can be adjusted electromechanically within a mechanically limited range, a power electronics that is configured to adjust the actuator by means of a servomotor in two directions, specifically toward a positive collective offset or toward a negative collective offset, and a first microelectronics system that is configured to control the power electronics such that positive and
(Continued)

negative collective offsets can be set. The system also includes a second microelectronics system, which is configured to override the actuation of the first microelectronics system in order to act on the adjustment of the actuator, and by a first control line, which is configured to activate or deactivate the second microelectronics system through an external electrical signal.

15 Claims, 3 Drawing Sheets

(56) References Cited

U.S. PATENT DOCUMENTS

2012/0259483 A1 10/2012 Villano et al.
2015/0021441 A1 1/2015 Matsui

FOREIGN PATENT DOCUMENTS

| DE | 10 2009 027 418 A1 | 1/2011 |
| DE | 10 2015 224 258 A1 | 6/2017 |
| DE | 10 2018 207 141 A1 | 11/2019 |
| EP | 1 512 559 A2 | 3/2005 |
| EP | 3 061 687 A1 | 8/2016 |
| EP | 3 093 529 A2 | 11/2016 |
| WO | WO 2019/215019 A1 | 11/2019 |

OTHER PUBLICATIONS

International Search Report (and English Translation) and Written Opinion issued in PCT/EP2019/061326 dated Jul. 22, 2019 (15 pages).

* cited by examiner

ELECTROMECHANICAL ACTUATOR FOR SETTING A COLLECTIVE OFFSET FOR A HELICOPTER ON A BLADE-SPECIFIC BASIS

CROSS-REFERENCE TO RELATED APPLICATIONS

This application is a U.S. national stage application under 35 U.S.C. § 371 of PCT Application No. PCT/EP2019/061326, filed on May 3, 2019, and published as WO 2019/215019 A1 on Nov. 14, 2019, which claims priority from German Application No. DE 10 2018 207 141.1, filed on May 8, 2018, the entirety of both of which are each hereby fully incorporated by reference herein.

The invention relates to a system for controlling an electromechanical actuator for setting a collective offset for a helicopter on a blade-specific basis. The invention also relates to a method for operating such a system. The invention also relates to a computer program and a data medium that has such a computer program.

The system contains at least one actuator, the length and position of which can be adjusted electromechanically within a mechanically limited range. The system also has power electronics configured to adjust the actuator in two directions by means of a servomotor, specifically in the direction of a positive collective offset and in the direction of a negative collective offset. In addition, the system has first a microelectronics system configured to actuate the power electronics such that the collective offsets can be set.

Such a system is known, e.g., from DE 10 2009 001 39 3 A1. The actuator described therein is a control rod with two end eyes and a length adjustment region between the end eyes, wherein the adjustment region is also known as a hub or hub region. The control rod is connected at one end to the rotor blade via one end eye, and at the other end to a swashplate via the other end eye. The distance between the two end eyes can be altered in the adjustment region while in flight with a drive located in the adjustment region. An electric motor and a gearbox form a drive in the adjustment region for adjusting the length of the control rod in previously known control rod assemblies. Adjusting the length of the control rod results in blade-specific positive or negative collective offsets, depending on the direction of the adjustment (longer or shorter) in relation to the initial length.

These or similar systems are used to reduce vibrations in helicopters. These vibrations are measured, and the optimal lengths of the control rods for reducing these vibrations are calculated using an algorithm. The change in length of a control rod and the resulting change in the blade-specific collective offsets generates a change in the amplitude and phase of the helicopter vibrations. The difference vector between vibrations in the initial state of the control rod and vibrations generated by the length adjustment is referred to as a delta vibration. The maximum delta vibration depends on the length adjustment range of the control rod. The area obtained with the adjustment combinations of n adjustable control rods of the same range forms a polygon that has the same number of edges as there are control rods. Accordingly, n phase-shifted maximums of the same amplitude are obtained. If the initial state is in the middle of the adjustment range, a maximum delta vibration can be generated in the case of a malfunction that corresponds to size of the range times the amplification, wherein this amplification is understood to be the "gain" in the number of vibrations per adjustment increment.

The risk classification for errors that can be generated through a maladjustment of the actuators is based on the maximum delta vibrations that can be generated. The maximum delta vibrations as well as the efficacy of the system are directly proportional to the adjustment ranges of the actuators. A particularly effective system therefore always has a higher risk classification, i.e. a system with greater adjustment range. The development of the algorithm/software for large ranges, i.e. with a higher risk classification, is difficult and expensive.

In normal operation, the optimal lengths of the actuators are continuously calculated while in flight by a central computer in the airframe of the helicopter. The optimal lengths are sent to the actuators via a data bus in the form of target values. The lengths of the actuators are set by the integrated microelectronics system in accordance with the target values.

If the central computer, the sensors connected to the central computer, or the microelectronics system integrated in the actuator therein malfunctions, the length adjustments may be incorrect, resulting in turn in greater vibrations.

An electromechanical linear actuator for adjusting a control rod is known from DE 10 2009 027 418 A1.

The object of the present invention is to create a system for controlling an electromechanical actuator for setting a collective offset for a helicopter on a blade-specific basis that reduces the disadvantages of the prior art, i.e. the competence-based safety classification, and thus also the difficulties and costs for the algorithms/software.

This object is achieved with a second microelectronics system that is configured to override the first microelectronics in order to act on the adjustment of the actuator, and with a first control line that is configured to activate or deactivate the second microelectronics system with an external electrical signal.

It has proven to be the case that with the system according to the invention, an equally effective and efficient emergency shut-down system can be obtained for actuators, the position or length of which can be electromechanically adjusted to set a blade-specific collective offset for a helicopter. If all of the actuators have been set to the same length or position, a "default" vibration profile is obtained in the helicopter, regardless of the extent of the adjustment of the actuators. This vibration profile can be preset to a range of values through an appropriate selection of the nominal length or nominal position of the actuators, in which the helicopter can be controlled. This can result in a decrease in comfort, but not in such high vibrations that the safety of the aircraft is endangered.

The system according to the invention can contain a single actuator or numerous actuators for setting a blade-specific collective offset. There is therefore at least one power electronics system for each actuator, as well as first and second microelectronics systems and a first control line. If the helicopter has numerous actuators, the number of associated components, i.e. power electronics, first and second microelectronics, and first control lines, increases accordingly.

The term "actuator" refers in general to a drive element that converts electrical signals into physical values, in particular for a mechanical movement. The electrical signals can be understood as commands sent from a control unit to the actuator.

The angle of attack for all of the main rotor blades is uniformly altered by the helicopter pilot with a collective blade adjustment, resulting in a rising or lowering of the helicopter. The actuator is configured to alter this blade adjustment for a single main rotor blade by an offset. If the helicopter has an actuator for each main rotor blade, these actuators are configured as a whole to individually set the collective offsets for each main rotor blade in a helicopter. The actuator can preferably be in the form of a length-adjustable control rod or an eccentric actuator. The actuators are adjusted by means of a respective servomotor (abbreviated to "motor"), preferably a DC motor.

Power electronics are understood in general to be power electronic circuits, by means of which electrical energy can be transformed, i.e. in particular the respective amplitude, frequency and form of voltages and currents, depending on the requirements. Power electronics can also control the power flux in order to prevent overloads to individual lines and/or circuit components connected thereto. The conversion of the electrical energy takes place using semiconductor elements, which are compatible with the properties of the available energy sources. Examples of such power electronics components are thyristors, transistors, metal-oxide-semiconductor field-effect transistors (MOSFETs), insulated-gate bipolar transistors (IGBTs) and diodes as components of electronic power converters. The power electronics components are also referred to as circuit components.

Microelectronics are understood in general to be miniaturized electronic circuits, in particular integrated circuits (ICs).

To act on the setting of the actuators means, for example, to change the length or position of the actuator. It can also refer to stopping movement by the actuator, resulting in a "freezing" of the current collective offset.

A collective offset refers to a setting other than a neutral setting of the actuator, which is superimposed on a blade-specific basis on the collective blade setting by the pilot. A collective offset greater than the neutral setting of the actuator is referred to as a positive collective offset. A collective offset lower than the neutral setting of the actuator is referred to as a negative collective offset. The collective offsets are set within the available range of the actuator.

The external electrical signal can be triggered with a switch, for example, which is manually actuated by a member of the crew. Alternatively or additionally, the external signal can also can also be triggered automatically by an additional computer. It should be noted that the additional computer and the central computer, which continuously calculates the optimal lengths of the actuators while in flight under normal operating conditions, are not the same.

A control line is understood to be a connection between a transmitter and a receiver, which is obtained, e.g., via a cable, wire, optical fiber, or through radio signals. The receiver is primarily switched via a logical state to another operating mode or state via this connection, and/or a specific process is initiated or stopped, wherein the communication is normally unidirectional, from the transmitter to the receiver.

In a preferred embodiment of the invention, the second microelectronics system is configured to override the first microelectronics system, thus initiating a steady electrical braking of the control rod by means of a brake system, such that an adjustment of actuator through external forces or torques is suppressed.

The brake system is configured to reverse the torque of the servomotor to obtain an electrical braking. The brake system is preferably in the form of a short circuit brake or resistance brake, wherein the servomotor is disconnected from the power source and resistors are switched in increments to obtain a braking effect.

A further advantage has proven to be that the respective end positions of the actuators, and thus the maximum and minimum collective offsets, are known, and represent predictable values with which a safe vibration profile can be obtained.

For this reason, it is preferred that the second microelectronics system is configured to override the first microelectronics system, resulting in a steady torque exerted by the servomotor in a first of two directions, such that a minimum collective offset is obtained by the actuator. It is also preferred that the second microelectronics system is configured to override the first microelectronics, resulting in a steady torque exerted by the servomotor in a second of the two directions, such that a maximum collective offset is obtained by the actuator.

There is no need for a brake system in the two preferred embodiments described above. It may however be the case that a brake system is also provided, to obtain further setting options, in addition to the "minimum" and/or "maximum" offsets. This has the advantage that the user can select from numerous possible emergency shut-downs.

In another preferred embodiment, the second microelectronics system is configured to override the first microelectronics system, resulting in a steady torque by the servomotor in a first of two directions, such that a minimum or maximum collective offset is obtained by the actuator. In addition, the first control line is configured to activate the second microelectronics system through an electrical signal triggered by a user, such that a minimum collective offset is obtained by the actuator. The system also comprises a second control line that is configured to activate the second microelectronics system through an electrical signal triggered by a user, such that a maximum collective offset is obtained by the actuator. The first and second control lines are also configured to deactivate the second microelectronics system through an electrical signal triggered by a user.

At this point is should be noted that each actuator contains a power electronics, first and second microelectronics systems, and first and second control lines (for a blade-specific setting of a collective offset). This means that the number of these components corresponds to the number of actuators for the blade-specific setting of a collective offset.

Lastly, it is preferred that the first and second control lines are each dedicated to a first and second group of actuators such that the actuators can be adjusted toward a minimum collective offset or toward a maximum collective offset in groups.

According to a second aspect of the invention, the object is achieved by a method for operating a system for controlling an electromechanical actuator for setting a collective offset for a helicopter on an blade-specific basis, in which the method comprises the following steps:

adjusting an actuator by means of a servomotor actuated by a first power electronics system in one of two directions, specifically either toward a positive collective offset or toward a negative collective offset, actuating the power electronics by means of a first microelectronics system to set discrete collective offsets within an available range, providing a target value for the collective offset set by the first microelectronics system by means of a first central computer within the airframe of the helicopter, overriding the first microelectronics system by the second microelectronics system to act on the adjustment of the actuator, wherein the second microelectronics system is activated or deactivated by a user or a second central computer, in that the user or the second central computer triggers an electrical signal via a first control line.

A method is also preferred in which the activation results in setting a minimum collective offset. A method in which the activation results in setting a maximum collective offset is also preferred. More preferable is a method in which the activation triggers a braking process by a brake system, resulting in suppression of an adjustment of the actuator by external forces or torques.

A method is also preferred, in which the actuator is adjusted by means of a servomotor controlled by a first power electronics in one of two directions, specifically either toward a positive collective offset or toward a negative collective offset, the power electronics are controlled by means of the first microelectronics system for setting one or more collective offsets within an available range, wherein the user or a second computer within the airframe of the helicopter overrides the first microelectronics system via a first control line, and activates a second microelectronics system, such that a minimum collective offset is obtained by the actuator, or the user or a second central computer within the airframe of the helicopter overrides the first microelectronics system via a second control line, and activates a second microelectronics system, such that a maximum collective offset is obtained by the actuator.

Lastly, a method is preferred in which a first group of actuators is actuated via the first control line, or a second group of actuators is actuated via the second control line, such that the actuators are adjusted toward the minimum collective offset or two the maximum collective offset in groups.

The object of the invention can also be achieved in the form of a computer program, which directs a processor in a control unit to execute the steps for overriding the first microelectronics system and the termination thereof. The control unit is preferably a second central computer within the airframe of the helicopter.

In this context, a computer-readable medium, i.e. a data medium, also belongs to the subject matter of the invention, on which a computer program, described above, is stored such that it can be retrieved.

The present invention shall be described in greater detail below in reference to the drawings. Therein:

Figure 1:
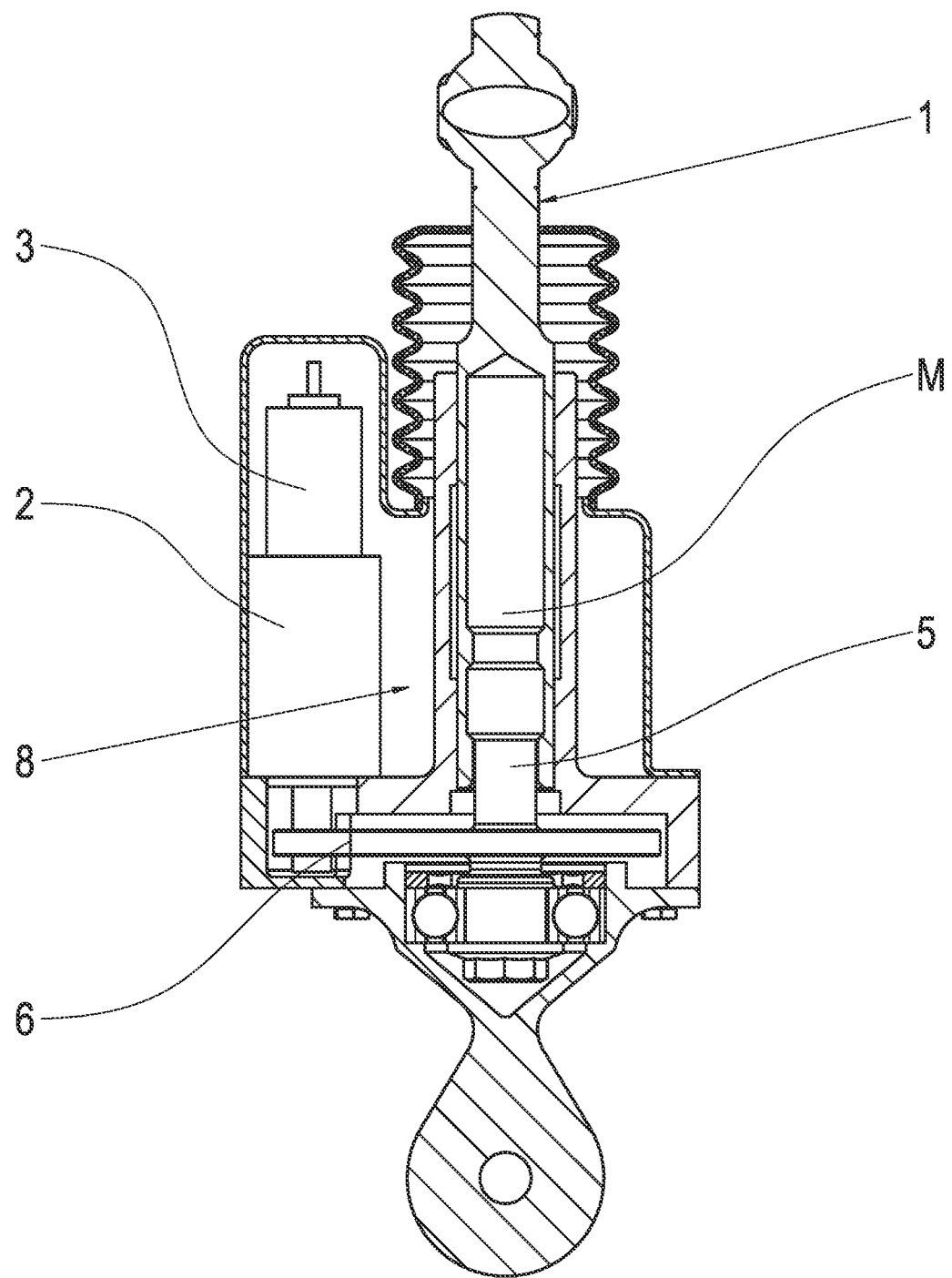
FIG. 1 shows a cutaway, three-dimensional view of an actuator in a preferred embodiment.

FIG. 1 shows an adjustable control rod 1 for setting a collective offset for a single main rotor blade on a helicopter, representing a preferred embodiment of an actuator. This control rod has a known bearing receiver at the end facing the rotor blade, and another bearing receiver at the other end, facing the motor. The length of the control rod 1 can be adjusted within a predefined range. There is at least one actuator 8 for adjusting the length of the control rod 1, which comprises a spindle drive that is driven by an electric motor M via a planetary gearing 2. The spindle drive comprises a spindle nut 4 connected to the control rod 1, which is moved axially by a spindle 5. The drive for the spindle 5 is obtained via a gearwheel or spur wheel stage 6, which is driven by the electric motor M via the planetary gearing 2.

The actuator can also be an eccentric.

Figure 2:
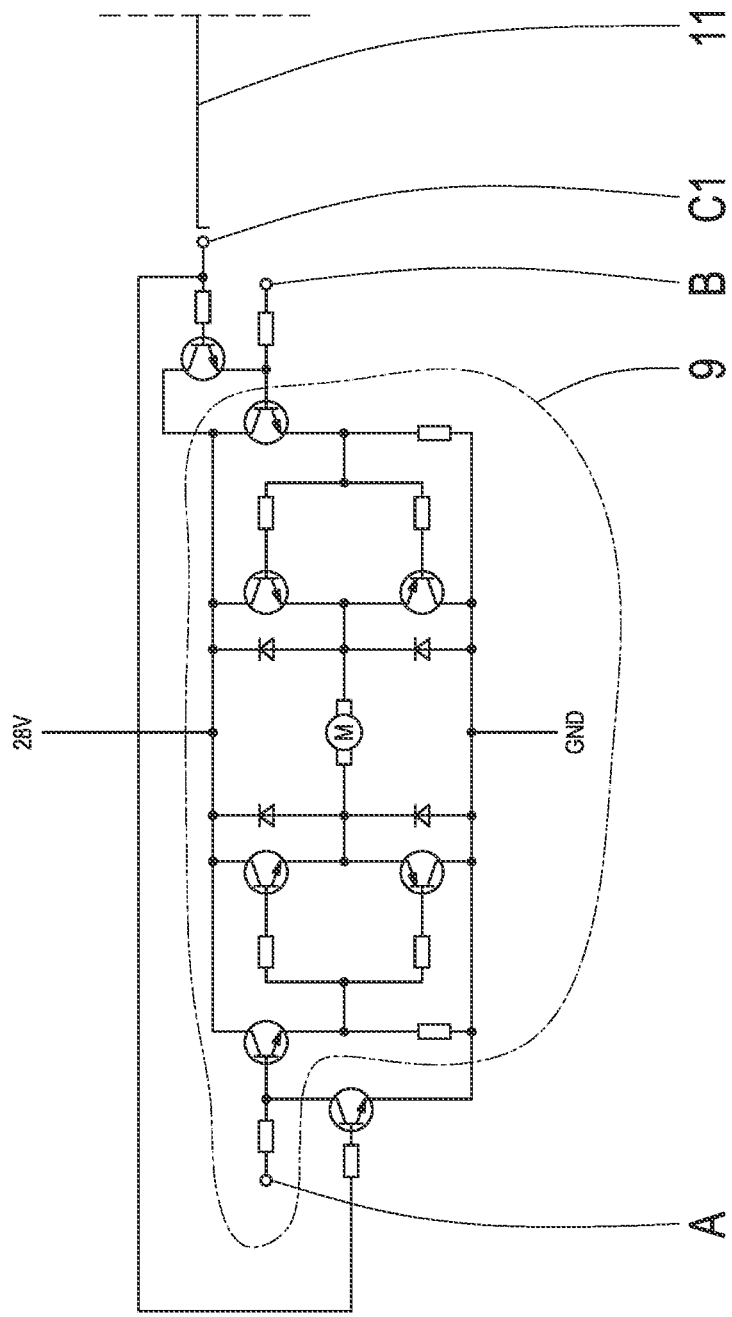
FIG. 2 shows a circuit diagram for a control motor for an actuator, which has a first control line.

FIG. 2 shows an H-bridge assembly in a schematic illustration, and represents, by way of example, the power electronics component 9 in a motor control device known to the person skilled in the art for the actuator shown in FIG. 1. The power electronics is connected to a 28 volt power source. A DC motor M can be driven in both directions by means of the circuit components, such that the actuator 1 can be adjusted toward a maximum length or toward a minimum length. Collective offsets can be set within these two limits. The adjustment toward a maximum length of the control rod takes place via input A. The adjustment toward a minimum length of the control rod takes place via the input B. The circuit components in the power electronics are controlled by a first microelectronics system. The circuit components are transistors, resistors, and diodes.

The present power electronics 9 belong to general expert knowledge, such that there is no need to explain the individual functions of the components thereof.

The motor control also has, in addition to the inputs A and B, an input C1, which can be activated by means of a second microelectronics system via a first control line 11. The activation is obtained, for example, through manual actuation of a switch in the cockpit, or automatically through a second central computer within the airframe of the helicopter. An external electronic signal is issued through the activation, which leads to a change in the voltage in the first control line 11. The second microelectronics system then overrides the voltage level of the electrical outputs at the inputs A and B, such that the control commands from the microelectronics system integrated in the control rods 1 become ineffective.

The power electronics 9 in the control rod 1 are configured to cause a steady motor torque in one of two directions through the activation of the first control line 11. As a result, the length of the control rod 1 is either maximized or minimized, depending on the embodiment.

In the case of maladjustment of the length of the control rod 1 caused by the first central computer or by the internal microelectronics in the actuator, the length of the control rod can therefore be altered to a defined length setting by the crew or by a second central computer. By deactivating the first control line 11, e.g. through a renewed actuation of the switch, the override can be suspended.

If all of the control lines 1 have the same length settings, a known "default" vibration profile is set in the helicopter. This vibration profile ensures safe operation of the aircraft, even if this is less comfortable for the crew.

Numerous first control lines 11 can be connected in parallel to numerous control rods 1 for signal transfer in a control rod assembly, not shown. As a result, the control rods 1 are adjusted in the same direction when the control line 11 is activated or actuated.

Figure 3:
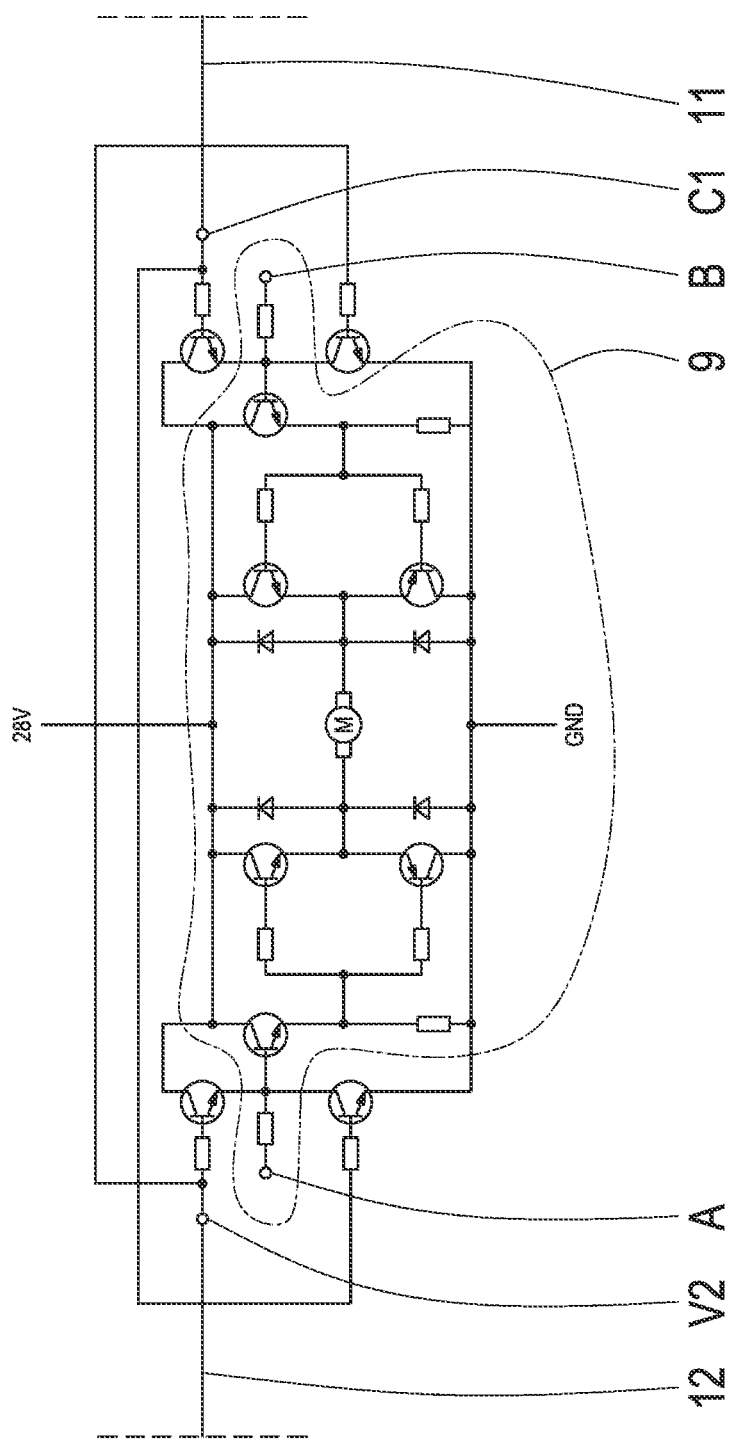
FIG. 3 shows a circuit diagram for a control motor for an actuator according to the invention, which has a first and second control line.

In contrast to FIG. 2, the assembly in FIG. 3 has another input C2, and the control rod 1 has a second control line 12. The first control line 11 is dedicated to the direction toward the shortest length, and the second control line 12 is dedicated to the direction toward the longest length. The control rod 1 can thus be adjusted manually toward the greatest or shortest length. As with the embodiment shown in FIG. 2, a second microelectronics system also overrides a first microelectronics system integrated in the control rod 1 via the first or second control line 11, 12 in the embodiment shown in FIG. 3.

As in FIG. 2, numerous first control lines 11 can be interconnected, and numerous second control lines 12 can be interconnected, for signal transfer here as well, by means of a respective parallel connection. The lengths of the control rods 1 are thus maximized or minimized when the first or second control lines 11, 12 are activated or actuated.

In another embodiment, not shown, the control lines 11, 12 are connected separately for signal transfer. A first group of control rods 1 can thus be assigned one of the two control lines 11, 12, and a second group of control rods 1 can be assigned the other of the two control lines 12, 11.

It is also conceivable to assign a first group of control rods 1 a first number of first and second control lines for signal transfer, and assign a second group of control rods 1 a second number of first and second control lines for signal transfer.

This allows for different patterns of actuator lengths to be set. With a rotor that has an even number of control rods, for example, the first half can be "lengthened" by successive control rods, and the second half can be "shortened" by successive control rods, or vice versa. It is also conceivable to "shorten" and "lengthen" the rotor blades in an alternating sequence.

With a six-bladed helicopter, for example, the first three rotor blades can thus be "lengthened" and the second three rotor blades can be "shortened," or vice versa. Or the first, third, and fifth rotor blades can be "lengthened," and the second, fourth, and sixth rotor blades can be "shortened," or vice versa. As a result, different effects on the vibrations of the aircraft can be obtained.

As explained above, the activation can take place manually, by means of a switch actuated by the pilots or a member of the crew. It is conceivable, for example, to place a rotary switch in the cockpit with a certain number of preset patterns that can be activated therewith, such that certain control lines receive a "high" voltage level, and others a "low" voltage level. This can be implemented in a switch, e.g. through mechanical contacts. The pilot can then switch between various control rod settings by turning the switch.

REFERENCE SYMBOLS 1 control rod
2 planetary gearing
4 spindle nut
5 spindle
6 gearwheel/spur wheel stage
8 actuator for adjusting the control rod length
9 power electronics part of a motor control for the control rod
11 first control line
12 second control line
A input A for the motor control
B input B for the motor control
C1 input for first control line
C2 input for second control line
M electric motor, DC motor

The invention claimed is:

1. A system for controlling an electromechanical actuator for setting a collective offset for a helicopter on a blade-specific basis, wherein the system comprises:
   at least one actuator configured such that at least one of the length or position of the at least one actuator is electromechanically adjusted within a mechanically limited range;
   a power electronics that is configured to adjust the at least one actuator in at least two directions by a servomotor, wherein the at least two directions comprise a first direction toward a positive collective offset and a second direction toward a negative collective offset;
   a first microelectronics system that is configured to activate the power electronics to set at least one of a positive collective offset or a negative collective offset;
   a second microelectronics system that is configured to override the activation of the first microelectronics system and to adjust the actuator; and
   a first control line that is configured to at least one of activate or deactivate the second microelectronics system through an external electrical signal.

2. The system according to claim 1, wherein the second microelectronics system is configured to override the activation of the first microelectronics system, such that a steady electrical braking of the actuator is obtained by means of a braking device, such that an adjustment of the actuator through external forces or torques is suppressed.

3. The system according to claim 1, wherein the second microelectronics system is configured to override the activation of the first microelectronics system, such that a steady motor torque from the servomotor is adjusted in the second direction, such that a minimum collective offset is set by the actuator.

4. The system according to claim 1, wherein the second microelectronics system is configured to override the activation of the first microelectronics system and thus adjust a steady motor torque from the servomotor in the first direction, such that a maximum collective offset is set by the actuator.

5. The system according to claim 1,
   wherein the second microelectronics system is configured to override the activation of the first microelectronics system and thus adjust a steady motor torque from the servomotor in one of the two directions, such that at least one of a minimum or maximum collective offset is set by the actuator,
   wherein the first control line is configured to activate the second microelectronics system through the external electrical signal, such that the minimum collective offset is set by the actuator, wherein the system also comprises:
   a second control line, which is configured to activate the second microelectronics system through a second external electrical signal, such that the maximum collective offset is set by the actuator,
   wherein the first and second control lines are also configured to deactivate the second microelectronics system through the external electrical signal and the second external electrical signal.

6. The system according to claim 5, wherein the first and second control lines are each assigned to a first and second group of actuators, such that the actuators can be adjusted in groups at least one of toward the minimum collective offset or toward the maximum collective offset.

7. The system according to claim 1, wherein the actuator is at least one of a length-adjustable control rod or an eccentric actuator for adjusting a rotor blade.

8. A method for operating a system for controlling an electromechanical actuator for setting a collective offset for a helicopter on a blade-specific basis, the method comprising:
   adjusting an actuator by means of a servomotor controlled by a first power electronics in at least one of two directions of either a positive collective offset or a negative collective offset;

actuating the power electronics by a first microelectronics system to set collective offsets;

providing a target value for the collective offset that is to be set by the first microelectronics system by a first computer within an airframe of the helicopter; and overriding the first microelectronics system by a second microelectronics system in order to adjust the actuator, wherein the second microelectronics system is activated or deactivated by at least one of a user or a second central computer, wherein the user or the second central computer triggers an electrical signal via a first control line.

9. The method according to claim 8, wherein overriding the first microelectronics system by the second microelectronics system in order to adjust the actuator further comprises adjusting the actuator to a minimum collective offset.

10. The method according to claim 8, wherein overriding the first microelectronics system by the second microelectronics system in order to adjust the actuator further comprises adjusting the actuator to a maximum collective offset.

11. The method according to claim 8, wherein overriding the first microelectronics system by the second microelectronics system in order to adjust the actuator further comprises adjusting the actuator to activate a braking procedure by a braking device, such that an adjustment of the actuator by external forces or torques is suppressed.

12. The method according to claim 8, further comprising:
activating the second microelectronics system via the first control line such that a minimum collective offset is set by the actuator.

13. The method according to claim 12, wherein a first group of actuators is actuated via the first control line, and where a second group of actuators is actuated via a second control line, such that the actuators are configured to be adjusted in groups toward minimum collective offsets or toward maximum collective offsets.

14. A non-transitory computer-readable medium containing a computer program that, when executed by a central computer of a helicopter, cause the central computer to perform a method comprising:
activating a second microelectronics system to override a first microelectronics system configured to adjust at least one rotor actuator by triggering an electrical signal to be communicated to the second microelectronics system via a first control line.

15. The method according to claim 8, further comprising:
activating the second microelectronics system via a second control line triggered by at least one of the user or the second central computer such that a maximum collective offset is set by the actuator.

* * * * *